United States Patent
Persico et al.

(10) Patent No.: US 6,707,663 B2
(45) Date of Patent: Mar. 16, 2004

(54) EDGE FORMATION PROCESS FOR ALUMINUM SOLID ELECTROLYTIC CAPACITOR

(75) Inventors: Daniel Francis Persico, Simpsonville, SC (US); Philip Michael Lessner, Simpsonville, SC (US); Albert Kennedy Harrington, Mauldin, SC (US); Lisa Ann Sayetta, Fountain Inn, SC (US)

(73) Assignee: Kemet Electronics Corporation, Simpsonville, SC (US)

(*) Notice: Subject to any disclaimer, the term of this patent is extended or adjusted under 35 U.S.C. 154(b) by 18 days.

(21) Appl. No.: 10/379,898

(22) Filed: Mar. 6, 2003

(65) Prior Publication Data

US 2003/0164526 A1 Sep. 4, 2003

Related U.S. Application Data

(62) Division of application No. 09/874,407, filed on Jun. 6, 2001, now Pat. No. 6,562,652.

(51) Int. Cl.[7] .............................................. H01G 9/04
(52) U.S. Cl. ...................... 361/528; 361/523; 361/508; 361/509; 361/525; 29/25.01
(58) Field of Search .............................. 361/528, 523, 361/508, 509, 525, 529, 511, 512, 502, 503, 516, 504; 29/25.03

(56) References Cited

U.S. PATENT DOCUMENTS

| | | | | |
|---|---|---|---|---|
| 3,796,644 A | | 3/1974 | Bernard | |
| 3,872,358 A | * | 3/1975 | Murakami et al. | |
| 4,113,579 A | | 9/1978 | Randall, Jr. et al. | |
| 4,159,927 A | | 7/1979 | Bernard et al. | |
| 4,481,084 A | * | 11/1984 | Chen et al. | |
| 4,537,665 A | | 8/1985 | Nguyen | |
| 4,715,936 A | | 12/1987 | Florio | |
| 5,078,845 A | * | 1/1992 | Kunugihara et al. | |
| 6,243,256 B1 | * | 6/2001 | Furuta et al. | |
| 6,307,735 B1 | * | 10/2001 | Saito et al. | |
| 6,344,966 B1 | | 2/2002 | Mondem et al. | |
| 6,375,688 B1 | | 4/2002 | Akami et al. | |
| 6,459,565 B1 | * | 10/2002 | Lessner et al. | |

FOREIGN PATENT DOCUMENTS

| | | |
|---|---|---|
| EP | 1 028 441 | 8/2000 |
| JP | 60-240127 | 11/1985 |

OTHER PUBLICATIONS

A.J. Dekker and W. Ch. Van Geel, Philips Research Report 2, 312 (1947).
Transport Numbers and the Structure of the Porous Anodic Films on Aluminum A. Dekker, et al., J. Electrochem. Soc.: Electrochemical Science; vol. 117, No. 4, Apr. 1970, pp. 440–448.

* cited by examiner

*Primary Examiner*—Dean A. Reichard
*Assistant Examiner*—Nguyen T. Ha
(74) *Attorney, Agent, or Firm*—Banner & Witcodd Ltd.

(57) ABSTRACT

A solid electrolytic capacitor comprising a foil coated with a dielectric oxide film, wherein the coated foil has slit or cut edges, and the slit or cut edges have been reformed by anodizing the foil in an aqueous oxalic acid electrolyte, then forming the foil in an aqueous citrate electrolyte, then depolarizing the foil, and then forming the foil in an aqueous phosphate electrolyte.

15 Claims, 1 Drawing Sheet

EDGE FORMATION PROCESS FOR ALUMINUM SOLID ELECTROLYTIC CAPACITOR

This application is a divisional application of U.S. Ser. No. 09/874,407, filed Jun. 6, 2001 now U.S. Pat. No. 6,562,652, which is hereby incorporated by reference in its entirety.

FIELD OF THE INVENTION

This invention relates to an edge formation process for aluminum solid electrolytic capacitors.

BACKGROUND OF THE INVENTION

Electrolytic capacitors with excellent high frequency characteristics are in high demand due to speed requirements of circuits for devices such as computers and wireless communications. In addition, high capacitance is required in the low voltage circuits that are used in these devices. Conductive polymers such as polypyrrole, polyaniline, polythiophene, and their derivatives, are finding increasing use as cathodes for electrolytic capacitors because such polymers have much higher conductivity than the liquid electrolytes and manganese dioxide cathodes currently used in these capacitors.

A wet electrolytic capacitor has an anode metal, a dielectric, a liquid electrolyte, and a cathode. Valve metals such as tantalum, aluminum, and niobium are particularly suited for the manufacture of high surface area electrolytic capacitors. The valve metal serves as the anode, and an oxide of the valve metal, coated by electrochemical oxidation of the valve metal surfaces, serves as the dielectric. The process of electrochemically coating a valve metal with a dielectric oxide is called formation. In order to maximize the dielectric surface area, and hence increase the volumetric efficiency of the capacitor, the valve metal substrates are porous bodies. These porous bodies can take the form of etched foils or slugs of compressed powder. The liquid electrolyte is impregnated into the porous body. A high surface area cathode completes the circuit. Etched aluminum foil is a particularly preferred anode material for wet electrolytic capacitors.

In the manufacture of wet aluminum electrolytic capacitors, the aluminum foil is etched to high surface area, coated with a dielectric oxide film, slit to the proper width, and then cut to length. During the slitting and cutting to length operations, the dielectric oxide film on the edges is damaged and bare aluminum is exposed. The foil is then wound, placed in a can (along with the cathode), and filled with a non-aqueous fill electrolyte. The non-aqueous fill electrolyte is composed of, for example, borates in non-aqueous solvents containing a very small amount of water. After filling with electrolyte, the cans are sealed to prevent electrolyte from escaping and to keep additional water out.

A critical part of conditioning a wet aluminum electrolytic capacitor is repairing the damage to edges of the slit, and cut-to-length, foil and any damage to the dielectric oxide on the face of the foil that incurred during the winding operation. If these edges are not re-formed, the capacitor will have a high leakage current. The non-aqueous fill electrolytes, containing a very small amount of water, are very efficient in re-forming oxide on the edges.

In the manufacture of a solid aluminum electrolytic capacitor with a conductive polymer cathode, the foil etching, forming, and slitting, are done in a similar manner to that of wet aluminum electrolytic capacitor. However, the conductive polymer is not efficient at re-forming a dielectric film on the slit and cut edges and at repairing damaged oxide on the face. Therefore, this must be done in a separate step before the conductive polymer is impregnated into the aluminum/aluminum oxide anode.

Re-forming the slit and cut edges can be accomplished by immersing the elements in a formation bath or a series of formation baths. The requirements for these edge formation baths are threefold: 1) They must form a high quality dielectric oxide on the cut edges, 2) They must repair any damage to the dielectric oxide on the face of the element that was damaged during the slitting and cutting to length operation, and 3) They must not damage the dielectric oxide already on the face of the element. In addition, the formed dielectric oxide needs to have excellent hydration resistance.

Hydration resistance is critical for aluminum solid electrolytic capacitors with conductive polymer cathodes. After impregnation with the conductive polymer, the capacitors are washed extensively in water to remove excess reactants and reactant byproducts. This washing is at elevated temperature (>50° C.). The aluminum oxide film is exposed to conditions very conducive to hydration during this washing process, and, therefore, the aluminum oxide film must have a high degree of hydration resistance. Hydration of the oxide during the washing process, or on subsequent storage after washing, can result in hydrated oxide in the weld zone and this hydrated oxide is difficult or impossible to weld through to make a good attachment to the lead frame.

A high degree of hydration resistance is also required during storage or use of capacitors in high humidity environments. If the oxide becomes hydrated during use, the capacitor leakage current will increase, or the capacitor can become a short circuit.

It was discovered that prior art electrolytes have deficiencies when used for edge formation of aluminum anodes intended for used in solid aluminum electrolytic capacitors with conductive polymer cathodes. The fill electrolytes used in wet aluminum capacitors are not suitable for use outside a sealed can because of their toxic nature and their propensity to adsorb water from the air. Thus they cannot be used in open, mass production electrolyte baths.

Electrolytes used for the production of the original aluminum oxide film are also not suitable because they are designed to form oxide on a freshly etched surface or a hydrated oxide surface and not designed to form oxide on cut edges and to repair oxide on the face (cf. U.S. Pat. Nos. 3,796,644; 4,113,579; 4,159,927; 4,481,084; 4,537,665; 4,715,936).

Slitting and cutting the foil to length mechanically damages the edges and this mechanical damage should be repaired before or during the formation of the dielectric oxide film on the edge.

Acids such as oxalic and sulfuric acid produce a thick, porous, non-dielectric oxide films on aluminum. The process of coating a thick, porous, non-dielectric oxide on aluminum is called anodization. The use of these acids in aluminum anodization in combination with a further formation of a high quality dielectric oxide in salts of boric acid are known for high voltage aluminum oxide films (Dekker and van Geel, 1947, Dekker and Middelhoek, 1970, U.S. Pat. No. 5,078,845). Since these acids dissolve some aluminum and aluminum oxide they can also be used to smooth the edge of the slit and cut foil so that the edge is strengthened and a quality barrier layer can be formed beneath them on the edge. EP 1,028,441 A1 teaches the use of oxalic acid in combination with ammonium adipate to repair mechanical damage to the edge, coat a thick, porous base layer (both via oxalic acid anodization), and finally coat a dielectric layer beneath the porous layer (via ammonium adipate formation). However, under conditions at which acids such as oxalic and sulfuric are able to produce this thick, porous layer, they are extremely aggressive to the aluminum oxide film already formed on the face of the foil. Thus, the quality properties, such as hydration resistance, of the preexisting aluminum oxide are impaired. Moreover, ammonium adipate is incapable of restoring hydration resistance to the dielectric oxide on the face of the foil or forming a hydration-resistant oxide on the edges of the foil. The combination of oxalic acid and ammonium adipate is also incapable of forming a hydration-resistant oxide on the edges of the foil.

Several electrolyte systems have been considered for the edge formation of aluminum electrolytic capacitors with a solid conductive polymer cathode that overcomes the deficiencies of the prior art. Use of aqueous solutions of ammonium citrate and ammonium dihydrogen phosphate singly or in combination results in a hydration resistant oxide on the edge, but the initial leakage current is higher and capacitance is lower than when oxalic acid is used in combination with aqueous ammonium adipate. However, the oxalic acid anodization followed by formation in dicarboxylic acid salts, such as ammonium adipate, leads to an oxide with no hydration resistance, and thus the parts are unstable towards welding and long-term performance. Thus, a edge formation system that combines the high capacitance and low leakage current performance of the oxalic acid/ammonium adipate system with the hydration resistance of the ammonium citrate or ammonium phosphate systems is desired.

BRIEF SUMMARY OF THE INVENTION

It was discovered that edge formation in an aqueous oxalic acid solution, followed by formation in an aqueous citrate solution, followed by formation in an aqueous phosphate solution imparts high hydration resistance to foil, and when the foil is impregnated with a conductive polymer and fabricated into a capacitor, high capacitance and low leakage current also are obtained.

The invention is directed to a process for edge forming a slit and cut-to-length foil having a dielectric oxide film on at least one surface comprising anodizing the foil in an aqueous oxalic acid electrolyte, further forming the foil in an aqueous citrate electrolyte, preferably dibasic ammonium citrate electrolyte, depolarizing the foil, and then forming the foil in an aqueous phosphate electrolyte, preferably an ammonium dihydrogen phosphate.

The invention is further directed to a solid electrolytic capacitor comprising a foil coated with a dielectric oxide film, wherein the coated foil has slit or cut edges, and the slit or cut edges have been reformed by anodizing the foil in an aqueous oxalic acid electrolyte, then forming the foil in an aqueous citrate electrolyte, then depolarizing the foil, and then forming the foil in an aqueous phosphate electrolyte.

DETAILED DESCRIPTION OF THE INVENTION

Figure 1:
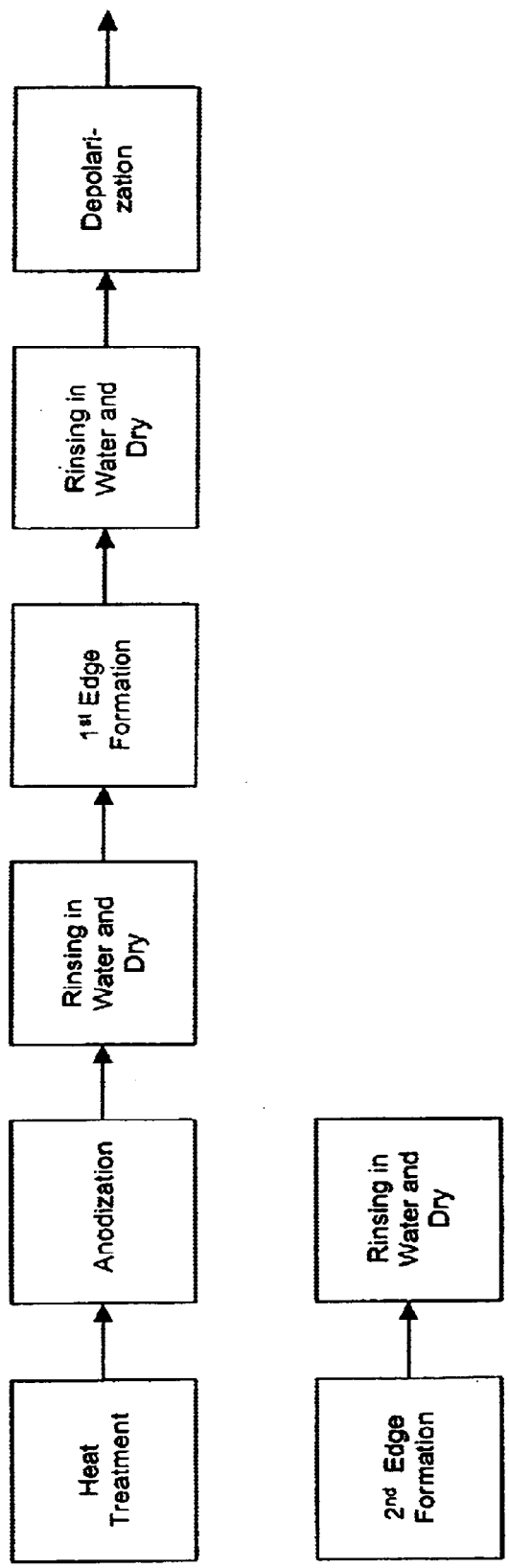
FIG. 1 shows a flowchart of the process of edge formation according to the invention.

Aluminum is etched to a high surface area and formed with a dielectric oxide and then slit to a width suitable for the production of solid electrolytic capacitors. The foil is then cut to length and welded to a carrier bar. A masking material is applied to the foil to define the area that will be subsequently edge formed.

A flowchart of the edge formation process is shown in FIG. 1. The foils are heat treated in an oven at elevated temperature to reduce the amount of surface hydration and to bring the foil surface to a well-defined state of wettability. The elevated temperature is generally from about 250° C. to about 550° C. and the foils are heat treated from about 2 minutes to about 12 hours. Preferably the foils are heat treated at a temperature from about 300° C. to about 350° C. for a period of 15 to 30 minutes.

The foil is cooled to room temperature and then placed in an oxalic acid bath to perform the anodization step in FIG. 1. During the anodization process, a thick, porous, non-dielectric oxide is formed on the slit and cut edges of the foil. Oxalic acid is extremely aggressive towards the preexisting aluminum oxide on the surface of the foil, and any outer layers of the aluminum oxide dielectric and the outer layers of the oxide are dissolved away or damaged.

The concentration of oxalic acid ranges from about 1 wt % to about 10 wt %, preferably about 3 wt % to about 8 wt %, more preferably about 5 wt %. The anodizing temperature ranges from about 0° C. to about 90° C., preferably about 10° C. to about 50° C., most preferably about 25° C. The time for anodization is from about 1 minute to about 10 minutes, preferably about 2 minutes. The foils are then rinsed in water to remove residual oxalic acid and dried to remove excess water.

The foils are then edge formed in an aqueous citrate electrolyte ($1^{st}$ edge formation). The citrates can be soluble citrates salts of alkali metal, amine, or ammonium cations.

Preferably, the electrolyte is ammonium citrate with a pH in the range of about 4 to about 9, preferably in the range of about 5 to about 7. The concentration of the citrate in water is from about 0.1 wt % to about 10 wt %, preferably about 0.5 wt % to about 5 wt %, more preferably about 1 wt %. The temperature of the electrolyte is from about 0° C. to about 90° C., preferably from about 50° C. to about 90° C., more preferably about 55° C. The time of formation depends on the concentration and temperature and is typically from about 3 minutes to about 20 minutes, preferably, about 10 minutes.

The foils are then rinsed of the citrate solution in water, dried to remove excess water, and depolarized. The depolarization step is used to expose any hydrate, trapped gas, or voids in the oxide produced during previous formation steps. Depolarization can take place by heating the foils to an elevated temperature or soaking on open circuit in a hot borate or citrate solution. Preferably, the foils are depolarized by heating the foils to about 250° C. to about 550° C., for about 30 seconds to about 2 hours, preferably about 300° C. for 30 minutes.

The foils are then edge formed again in an aqueous phosphate electrolyte, preferably ammonium dihydrogen phosphate ($2^{nd}$ edge formation). The concentration of the phosphate in water is from about 0.01 wt % to about 5 wt %, preferably about 0.05 wt % to about 2 wt %, more preferably about 0.1 wt %. The temperature of the phosphate electrolyte is from about 0° C. to about 90° C., preferably about 25° C. to about 90° C., more preferably about 55° C. The time of formation depends on the temperature and concentration and is typically from about 3 minutes to about 20 minutes, preferably about 7 minutes. The phosphates can be soluble phosphate salts of alkali metal, amine, or ammonium cations. Preferably, the electrolyte is ammonium dihydrogen phosphate at a concentration of from about 0.01 wt % to about 5 wt %. Optionally, the phosphate electrolyte can contain glycerine to prevent any airline corrosion of the foil (Melody et al., U.S. S/N).

After the formation in phosphate, the foils are given a final rinse in water and dried to remove excess water.

EXAMPLE 1

Aluminum foil was formed to a rated withstanding voltage of 13 volt to produce a foil with a capacitance of 119 $\mu F/cm^2$. The foil was slit to a 3.5 mm width, cut to length and welded to carrier bars. A masking line was applied to the capacitor to define an area of 6.1 mm×3.5 mm for edge formation.

The carrier bars were divided into three lots. One-half of each lot was treated according to the process of the invention: the foil was heat treated at 300° C. for 30 min., anodized in room temperature 5% oxalic acid at 13 V for 2 min., rinsed in water and dried, $1^{st}$ edge formed in 50° C. 1% ammonium citrate at 15 V for 10 min., rinsed in water and dried, depolarized at 300° C. for 30 min., $2^{nd}$ edge formed in 55° C. 0.1% ammonium dihydrogen phosphate at 13 V for 7 min., and then given a final rinse in water and dry. For the other half of each lot, the oxalic acid anodization was omitted: the parts were $1^{st}$ edge formed in 50° C. 1% ammonium citrate at 15 V for 10 min., rinsed in water and dried, depolarized at 300° C. for 30 min., $2^{nd}$ edge formed in 55° C. 0.1% ammonium dihydrogen phosphate at 13 V for 7 min., and then given a final rinse in water and dry.

A second masking line was applied. A conductive polymer layer of poly (3,4-ethylenedioxythiophene) was applied by chemical polymerization using techniques known to those skilled in the art (U.S. Pat. No. 4,910,645, Jonas et al.). The capacitors were then rinsed of polymerization byproducts and carbon and silver paste layers were applied.

The capacitance, dissipation factor (DF), equivalent series resistance (ESR), and leakage current (at 6 V) of the capacitor elements is shown in Table I.

followed by edge formation in ammonium dihydrogen phosphate, was 8.6% higher than the group edge formed only in ammonium citrate followed by ammonium phosphate. This group also exhibited superior leakage current (65% lower), superior DF (8.2% lower) and superior ESR (6.4% lower).

EXAMPLE 2

Aluminum foil was formed to a rated withstanding voltage of 13 volt to produce a foil with a capacitance of 119 $\mu F/cm^2$. The foil was slit to a 3.0 mm width, cut to length and welded to carrier bars. A masking line was applied to the capacitor to define an area of 6.1 mm×3.0 mm for edge formation. The carrier bars were divided into 5 lots. One-half of each lot was processed according to of FIG. 1; ammonium adipate was used for the $1^{st}$ and $2^{nd}$ edge formation steps: the foil was heat treated at 300° C. for 30 min., anodized in room temperature 5% oxalic acid at 13 V for 2 min., rinsed in water and dried, $1^{st}$ edge formed in 50° C. 9% ammonium adipate at 13 V for 10 min., rinsed in water and dried, depolarized at 300° C. for 30 min., $2^{nd}$ edge formed in 50° C. 9% ammonium adipate at 13 V for 7 min., and then given a final rinse in water and dry.

For the other half of each lot, the oxalic acid anodization step was omitted. The foil was heat treated at 300° C. for 30 min., $1^{st}$ edge formed in 50° C. 1% ammonium citrate at 15 V for 10 min., rinsed in water and dried, depolarized at 300° C. for 30 min., $2^{nd}$ edge formed in 55° C. 0.1% ammonium dihydrogen phosphate at 13 V for 7 min., and then given a final rinse in water and dry.

TABLE I

| | Oxalic/Citrate/Phosphate | | | | Citrate/Phosphate | | | |
| --- | --- | --- | --- | --- | --- | --- | --- | --- |
| Lot | Capacitance ($\mu F$) | DF (%) | ESR (ohms) | Leakage ($\mu A$) | Capacitance ($\mu F$) | DF (%) | ESR (ohms) | Leakage ($\mu A$) |
| 1 | 15.63 | 1.04 | 0.028 | 0.059 | 14.69 | 1.11 | 0.029 | 0.222 |
| 2 | 15.76 | 1.20 | 0.034 | 0.047 | 14.16 | 1.35 | 0.039 | 0.165 |
| 3 | 15.95 | 1.03 | 0.030 | 0.108 | 14.74 | 1.09 | 0.031 | 0.227 |
| Avg | 15.78 | 1.09 | 0.031 | 0.071 | 14.53 | 1.18 | 0.033 | 0.205 |

The average capacitance of the group anodized in oxalic acid, followed by edge formation in ammonium citrate, The lots were then subject to the same processes and measurements as in Example 1. Table II shows the results.

TABLE II

| | Oxalic/Adipate/Adipate | | | | Citrate/Phosphate | | | |
| --- | --- | --- | --- | --- | --- | --- | --- | --- |
| Lot | Capacitance ($\mu F$) | DF (%) | ESR (ohms) | Leakage ($\mu A$) | Capacitance ($\mu F$) | DF (%) | ESR (ohms) | Leakage ($\mu A$) |
| 1 | 14.04 | 1.235 | 0.0357 | 0.0687 | 13.73 | 0.941 | 0.0318 | 0.093 |
| 2 | 14.11 | 0.866 | 0.0351 | 0.103 | 13.71 | 0.856 | 0.0346 | 0.1674 |
| 3 | 13.75 | 0.822 | 0.0347 | 0.0488 | 13.22 | 0.785 | 0.0334 | 0.0931 |
| 4 | 13.77 | 0.771 | 0.0295 | 0.0734 | 12.90 | 0.796 | 0.0339 | 0.1466 |
| 5 | 13.97 | 0.766 | 0.0304 | 0.0785 | 13.34 | 0.744 | 0.0355 | 0.1218 |
| Avg. | 13.93 | 0.892 | 0.0331 | 0.07448 | 13.38 | 0.824 | 0.0338 | 0.12438 |

When oxalic acid anodization followed by ammonium adipate formation was used in the process, the average capacitance was 4.1% higher and the average leakage was 40% less than with the edge formation process of ammonium citrate followed by ammonium phosphate. However, DF was 8% higher with the oxalic acid/ammonium adipate process.

In addition, one of the batches processed in oxalic acid and ammonium adipate had visible signs of hydration in the weld zone after standing for several days. None of the batches processed in ammonium citrate and ammonium phosphate showed hydration.

EXAMPLE 3

Etched foil was formed and then slit. The foil was cut to a length of 11 mm and attached to stainless steel process bars. A polyimide masking material was applied to each of the foil elements on the carrier bar.

The carrier bars were divided into three groups. The foils were processed as shown in FIG. 1. The electrolytes for each anodization or formation step are shown in Table III. After edge formation, each group was hydrated in deionized water for 90 minutes at 70° C. The foils were then reformed in 9% ammonium adipate (at 50° C.) for 24 minutes and the charge under the reformation curve was calculated from the measured current. The last column of Table III shows the calculated charge in millicoulombs per square cm of geometric surface area.

TABLE III

| Anodization | 1st Edge Formation | 2nd Edge Formation | Reform Charge After Hydration mC/cm² |
|---|---|---|---|
| OA | AA | AA | 701 |
| OA | AC | ADP | 15.4 |
| None | AC | ADP | 10.7 |

OA = 5% oxalic acid (Room temperature)
AA = 9% ammonium adipate (50° C.)
AC = 1% dibasic ammonium citrate (55° C.)
ADP = 0.1% ammonium dihydrogen phosphate (55° C.)

The group that was anodized in oxalic acid followed by edge formation in ammonium adipate was severely discolored and had a large capacitance decrease (capacitance went from 17.7 to 3.2 µF/element) after the hydration test. A charge of >700 mC/cm² was passed during the reform after hydration. The color change is indicative of hydrated oxide formation. The large capacitance decrease occurs because of the formation of massive amounts of hydrated oxide, which plug the fine pores of the etched foil. The large charge passed during the reform is also an indicator of a large amount of hydrous oxide; the charge passed during reform is partial conversion of this hydrous oxide back to barrier oxide.

In contrast, the groups that were anodized in oxalic acid followed by edge formation in ammonium citrate followed by ammonium phosphate and ammonium citrate followed by ammonium phosphate showed no discoloration and a reform charge of greater than one order of magnitude less than the group edge formed in oxalic acid and ammonium adipate. Capacitance was little changed before and after hydration. Thus a hydration resistant oxide was produced.

Examples 1 and 2 demonstrate that an oxalic acid anodization in combination with an ammonium adipate or ammonium citrate/ammonium phosphate edge formation can produce higher capacitance and lower leakage current than when the oxalic acid anodization is omitted. However, Example 3 demonstrates that an oxalic acid anodization followed by an ammonium adipate edge formation produces an oxide that is very susceptible to hydration. Only the electrolyte combination of this invention: oxalic acid followed by ammonium citrate followed by ammonium phosphate can produce a capacitor with high capacitance, low leakage current, and an oxide that is resistant to hydration.

While the invention has been described with respect to specific examples including presently preferred modes of carrying out the invention, those skilled in the art will appreciate that there are numerous variations and permutations of the above described systems and techniques that fall within the spirit and scope of the invention as set forth in the appended claims.

We claim:

1. A solid electrolytic capacitor comprising a foil coated with a dielectric oxide film, wherein the coated foil has slit or cut edges, and the slit or cut edges have been reformed by anodizing the foil in an aqueous oxalic acid electrolyte, then forming the foil in an aqueous citrate electrolyte, then depolarizing the foil, and then forming the foil in an aqueous phosphate electrolyte.

2. The capacitor of claim 1 wherein the foil is aluminum.

3. The capacitor of claim 1 wherein, prior to anodizing the foil in the aqueous oxalic acid electrolyte, the foils are heat-treated.

4. The capacitor of claim 3 wherein the foils are heat-treated at a temperature of from about 250° C. to about 550° C. for about 2 minutes to about 12 hours.

5. The capacitor of claim 4 wherein the foils are heat-treated at a temperature from about 300° C. to about 350° C. for about 15 to about 30 minutes.

6. The capacitor of claim 1 wherein the concentration of oxalic acid in the aqueous oxalic acid electrolyte is from about 1 wt % to about 10 wt %.

7. The capacitor of claim 1 wherein the temperature of the aqueous oxalic acid electrolyte is from about 0 C. to about 90° C.

8. The capacitor of claim 1 wherein the citrate is ammonium citrate.

9. The capacitor of claim 1 wherein the concentration of citrate in the aqueous citrate electrolyte is from about 0.1 wt % to about 5 wt %.

10. The capacitor of claim 1 wherein the temperature of the aqueous citrate electrolyte is from about 0 C. to about 90° C.

11. The capacitor of claim 1 wherein the concentration of phosphate in the aqueous phosphate electrolyte is from about 0.1 wt % to about 5 wt %.

12. The capacitor of claim 1 wherein the temperature of the aqueous phosphate electrolyte is from about 0 C. to about 90° C.

13. The capacitor of claim 1 wherein the phosphate is ammonium dihydrogen phosphate.

14. The capacitor of claim 13 wherein the concentration of the ammonium dihydrogen phosphate in the aqueous phosphate electrolyte is about 0.01 wt % to about 5 wt %.

15. The capacitor of claim 1 wherein the aqueous phosphate electrolyte further comprises glycerine in an amount to prevent airline corrosion of the foil.

* * * * *